United States Patent
Fukuoka et al.

(10) Patent No.: US 6,821,495 B2
(45) Date of Patent: Nov. 23, 2004

(54) METHOD FOR THE CONTINUOUS PRODUCTION OF SILICON OXIDE POWDER

(75) Inventors: Hirofumi Fukuoka, Annaka (JP); Susumu Ueno, Annaka (JP); Takeshi Fukuda, Chiyoda-ku (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 557 days.

(21) Appl. No.: 09/773,677

(22) Filed: Feb. 2, 2001

(65) Prior Publication Data

US 2001/0012503 A1 Aug. 9, 2001

(30) Foreign Application Priority Data

Feb. 4, 2000 (JP) ........................................ 2000-027582

(51) Int. Cl.⁷ .............................................. C01B 33/20
(52) U.S. Cl. ...................................................... 423/325
(58) Field of Search ................................ 423/325, 335, 423/336

(56) References Cited

FOREIGN PATENT DOCUMENTS

| | | |
|---|---|---|
| JP | 63-103815 | 5/1988 |
| JP | 9-110412 | 4/1997 |

OTHER PUBLICATIONS

English Abstract for Japan 9–110412, 4/97.

English Abstract for Japan 63–103815, 5/88.

*Primary Examiner*—Stanley S. Silverman
*Assistant Examiner*—Edward M. Johnson
(74) *Attorney, Agent, or Firm*—Millen, White, Zelano & Branigan, P.C.

(57) ABSTRACT

A silicon oxide powder can be continuously prepared by feeding a raw material powder mixture containing silicon dioxide powder into a reaction chamber (2) at a temperature of 1,100–1,600° C., to produce a silicon oxide gas, transferring the silicon oxide gas to a deposition chamber (11) through a transfer conduit (10) maintained at a temperature of from higher than 1,000° C. to 1,300° C., causing silicon oxide to deposit on a substrate (13) which is disposed and cooled in the deposition chamber, scraping the silicon oxide deposit, and recovering the deposit in a recovery chamber (18). The method and apparatus is capable of continuous and stable production of amorphous silicon oxide powder of high purity.

10 Claims, 1 Drawing Sheet

METHOD FOR THE CONTINUOUS PRODUCTION OF SILICON OXIDE POWDER

This invention relates to a method and apparatus for the continuous production of silicon oxide powder.

BACKGROUND OF THE INVENTION

In the prior art, silicon oxide powder is produced, as disclosed in JP-A 63-103815, by heat treating a raw material mixture containing silicon dioxide base oxide powder in a reduced pressure, non-oxidizing atmosphere to generate SiO vapor, and condensing the SiO vapor in a gas phase, thereby continuously forming fine amorphous SiO particles with a size of 0.1 µm or less. Alternatively, silicon raw material is heated, evaporated and deposited on a surface of a substrate having a coarse structure as disclosed in JP-A 9-110412.

The method of JP-A 63-103815 is capable of continuous production, but fails to produce high purity silicon oxide powder because the SiO powder produced is a fine powder which undergoes oxidization when taken out in the air. The method of JP-A 9-110412 can produce high purity silicon oxide powder, but does not lend itself to mass-scale production since it is of batchwise design. As a consequence, the silicon oxide powder becomes expensive.

SUMMARY OF THE INVENTION

An object of the invention is to provide a method and apparatus for the continuous and effective production of high purity silicon oxide powder at a low cost.

It has been found that a silicon oxide powder can be continuously prepared by feeding a raw material powder mixture containing at least silicon dioxide powder into a reaction furnace heated at a temperature of 1,100 to 1,600° C., to produce a silicon oxide vapor, transferring the silicon oxide vapor to a deposition chamber through a transfer conduit maintained at a temperature of from higher than 1,000° C. to 1,300° C., causing silicon oxide to deposit on a surface of a substrate which is disposed and cooled in the deposition chamber, scraping the silicon oxide deposit at desired intervals, and recovering the silicon oxide in a recovery chamber.

According to one aspect of the invention, there is provided a method for continuously preparing a silicon oxide powder, comprising the steps of feeding a raw material powder mixture containing silicon dioxide powder into a reaction furnace; heating the mixture in the furnace in an inert gas or in vacuum to a temperature of 1,100 to 1,600° C. to produce a silicon oxide gas; introducing the silicon oxide gas into a cooling chamber through a transfer conduit which is maintained at a temperature of from higher than 1,000° C. to 1,300° C., thereby causing silicon oxide to deposit on a surface of a substrate which is disposed and cooled in the cooling chamber; and continuously recovering the silicon oxide deposit.

According to another aspect of the invention, there is provided an apparatus for continuously preparing a silicon oxide powder, comprising a charge feed means for feeding a raw material powder mixture containing silicon dioxide powder to a reaction chamber; the reaction chamber where the raw material powder mixture is reacted to produce a silicon oxide gas; a transfer line for transferring the silicon oxide gas from the reaction chamber to a deposition chamber; the deposition chamber in which a substrate is disposed and cooled so that silicon oxide deposits on a surface of the cooled substrate; and a recovery means for recovering the silicon oxide deposit on the substrate.

BRIEF DESCRIPTION OF THE DRAWING

The only FIGURE.

DESCRIPTION OF THE PREFERRED EMBODIMENT

Figure 1:
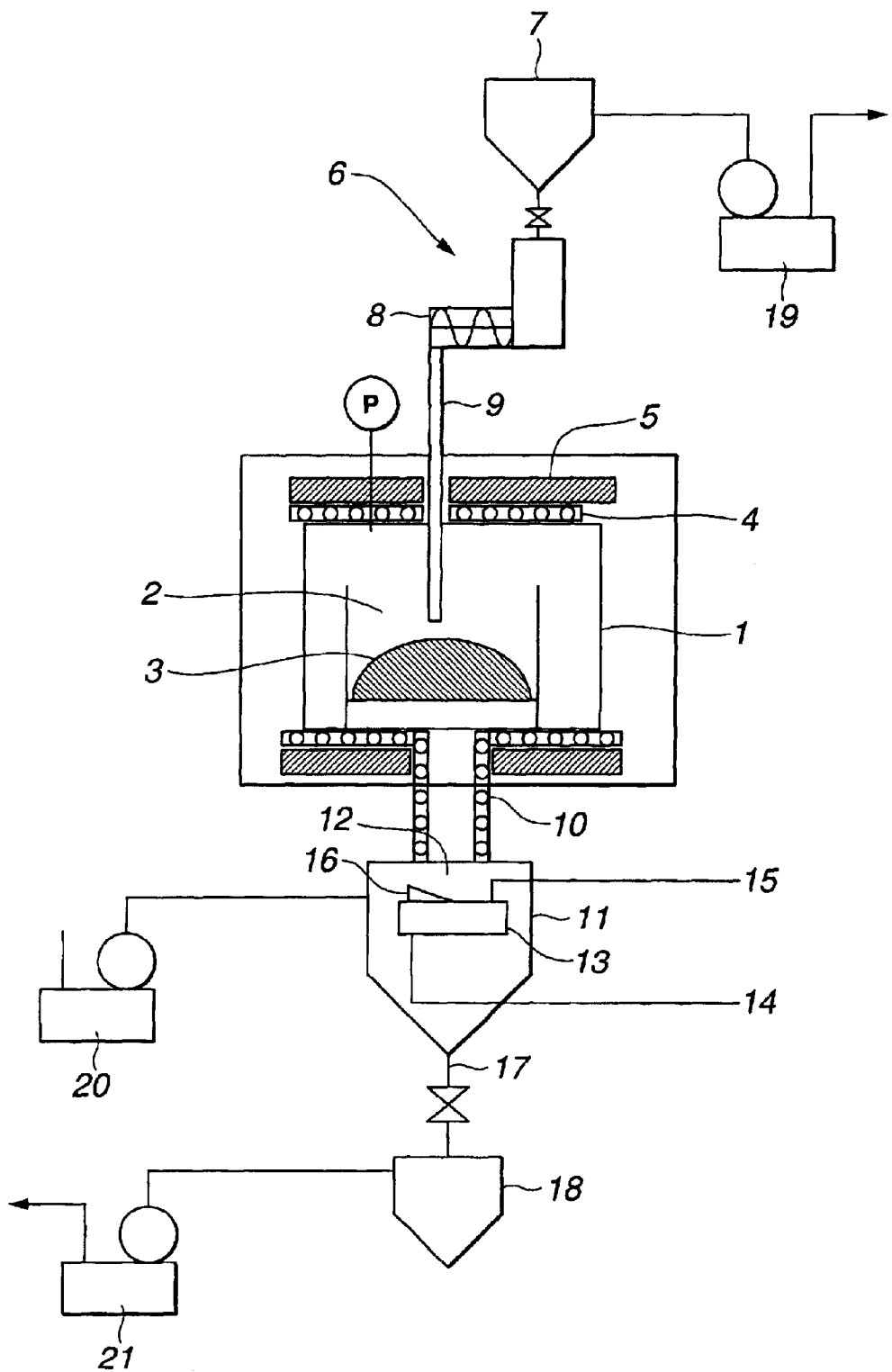
FIG. 1 is a schematic illustration of an apparatus for continuously producing silicon oxide powder according to the invention.

In the method for the continuous production of silicon oxide powder according to the invention, the raw material used is typically a mixture of a silicon dioxide powder and a reducing powder therefor. Exemplary reducing powders are metal silicon compounds and carbon-containing powders. Of these, metal silicon powder is preferably used since it is effective for enhancing reactivity and increasing a percent yield.

The raw material powder mixture is fed to a reaction furnace or chamber where it is heated and held at a temperature of 1,100 to 1,600° C., preferably 1,200 to 1,500° C., to produce a silicon oxide gas. Temperatures below 1,100° C. may retard the progress of reaction, resulting in a reduced productivity. Temperatures above 1,600° C. may cause the raw material powder mixture to melt, rather adversely affect reactivity, and impose a difficult choice of the furnace material.

The atmosphere in the furnace is an inert gas or vacuum. Reaction in vacuum is desired from thermodynamic considerations because the vacuum atmosphere provides higher reactivity and allows for reaction at lower temperature.

To the reaction chamber, the raw material powder mixture is fed at suitable intervals or continuously by a charge feed mechanism or feeder, so that reaction may be continuously effected.

The silicon oxide gas produced in the reaction chamber is continuously fed to a deposition chamber through a transfer line.

The transfer line is heated and held at a temperature of from higher than 1,000° C. to 1,300° C., and preferably 1,100 to 1,200° C. If the temperature of the transfer line is 1,000° C. or lower, the silicon oxide vapor will deposit and stick on the inner wall of the transfer line, causing troubles to the operation and precluding stable continuous operation. Heating to a temperature above 1,300° C. achieves no further effect and requires an increased electric power cost.

Disposed in the deposition chamber is a substrate having a surface. The substrate is cooled. When the silicon oxide gas is introduced into the deposition chamber and brought into contact with the cooled substrate so that the gas is cooled thereby, silicon oxide powder deposits on the substrate surface. The substrate is cooled for the purpose of producing amorphous silicon oxide. If the substrate is not cooled, the once deposited silicon oxide will undergo disproportionation reaction to separate into silicon dioxide and metallic silicon, or crystalline metal silicon is partially contained. The type of coolant is not critical although a choice may be made among liquids such as water and heat transfer media and gases such as air and nitrogen, depending on a particular purpose. Also the type of substrate is not critical, and high-melting metals such as stainless steel, molybdenum and tungsten are preferably used for ease of working. Preferably the substrate is cooled to a temperature of 200 to 500° C., and especially 300 to 400° C.

The silicon oxide powder deposited on the substrate is recovered by suitable means such as a scraper.

Referring to FIG. 1, there is illustrated one exemplary apparatus which can be used in practicing the above method.

The apparatus generally includes a charge feed mechanism 6, a reaction furnace 1, a transfer line 10, a deposition tank 11, and a recovery tank 18 connected in fluid communication. The reaction furnace 1 defines therein a reaction chamber 2 for receiving a raw material powder mixture 3. A heater 4 is disposed around the reactor furnace 1 so that the reaction chamber 2 may be heated at a temperature of 1,100 to 1,600° C. by conducting electricity to the heater 4. The reactor furnace 1 is further covered with a thermal insulator 5.

The charge feed mechanism 6 includes a hopper 7, a feeder 8, and a feed tube 9. The feeder 8 operates such that the raw material powder mixture is fed from the hopper 7 to the feeder 8 and then to the reaction chamber 2 through the feed tube 9. The feed operation can be effected in an intermittent or continuous manner while detecting the pressure P in the reaction furnace or chamber and estimating the amount of the raw material in the reaction chamber.

The deposition tank 11 is connected to the reaction furnace 1 through the transfer conduit or line 10. A heater is mounted on the transfer conduit 10 so as to maintain the conduit interior at a temperature from higher than 1,000° C. to 1,300° C. The deposition tank 11 defines therein a deposition chamber 12 where a substrate 13 is disposed horizontally. The substrate 13 is provided with a coolant circuit (not shown) which communicates with a coolant inlet tube 14 and a coolant outlet tube 15. As coolant flows through the coolant circuit, the substrate 13 is cooled to a predetermined temperature. The transfer conduit 10 extends transverse to one major surface of the substrate 13 so as to ensure the silicon oxide gas strikes and contacts the substrate 13 whereby silicon oxide powder deposits on the substrate 13. A silicon oxide powder recovery mechanism in the form of a scraper 16 is associated with the substrate 13 for scraping and recovering silicon oxide powder deposit on the substrate 13.

The recovery tank 18 is connected to the deposition tank 11 through a discharge conduit 17. The silicon oxide powder which deposits on the substrate 13 in the deposition chamber 12 and is scraped and collected by the scraper 16 falls through the discharge conduit 17 into the recovery tank 18. In this way, the silicon oxide powder is recovered. It is noted that vacuum pumps 19, 20 and 21 are connected to the hopper 7, the deposition tank 11, and the recovery tank 18, respectively.

The apparatus illustrated above enables continuous and stable production of amorphous silicon oxide powder.

The silicon oxide powder produced by the above method and apparatus generally has a BET specific surface area of 0.5 to 300 $m^2/g$, especially 5 to 100 $m^2/g$ and a purity of at least 99.9%, especially at least 99.95%. The silicon oxide powder is suitable for use in vapor deposition on package film and as lithium ion secondary battery negative electrode active material.

EXAMPLE

Examples of the invention are given below by way of illustration and not by way of limitation.

Example

A silicon oxide powder was produced using the continuous production apparatus illustrated in FIG. 1. The raw material was a powder mixture obtained by mixing equimolar amounts of silicon dioxide powder having a BET specific surface area of 200 $m^2/g$ and metallic silicon powder having BET specific surface area of 3 $m^2/g$ in an agitator. The reaction furnace 1 defining the reaction chamber 2 with a volume of 0.5 $m^3$ was charged with 20 kg of the powder mixture. The vacuum pump was actuated to evacuate the chamber 2 to a vacuum below 0.1 Torr. The heater 4 was energized to heat and hold the chamber 2 at a temperature of 1,300° C. The transfer conduit 10 was heated and held at a temperature of 1,100° C. Water was fed into the coolant inlet tube 14 to cool the stainless steel substrate 13. Next, the feeder 8 was operated to continuously feed the raw material powder mixture at a rate of 2 kg/hr into the reaction chamber to effect continuous reaction. As silicon oxide deposited on the substrate 13, the deposit was continuously scraped by the scraper 15 and recovered in the recovery chamber 18. The operation was continued for 120 hours whereupon silicon oxide powder was recovered at a rate of 1.6 kg/hr and in a yield of 80%. The silicon oxide powder obtained was an amorphous powder having a BET specific surface area of 8 $m^2/g$ and a purity of at least 99.9%. After the completion of operation, the interior of the apparatus was inspected, finding that the respective units remained intact.

Comparative Example 1

Silicon oxide was continuously produced under the same conditions as in Example except that the transfer conduit 10 was set at 1,000° C. The silicon oxide powder obtained was an amorphous powder having a BET specific surface area of 8 $m^2/g$ and a purity of at least 99.9%. After 25 hours from the start of operation, the transfer conduit 10 was clogged with the silicon oxide deposit, and the operation could no longer be continued.

Comparative Example 2

Silicon oxide was continuously produced under the same conditions as in Example except that the substrate 13 was not cooled. Upon inspection of the interior of the apparatus after the completion of operation, no significant problem was found. The silicon oxide powder obtained was found to contain crystalline metal silicon and was a low purity powder having a BET specific surface area of 4 $m^2/g$ and a purity of at least 92%.

The method and apparatus of the invention is capable of continuous and stable production of amorphous silicon oxide powder at a high purity and as a consequence, ensures delivery of inexpensive silicon oxide to the market.

Japanese Patent Application No. 2000-027582 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for continuously preparing a silicon oxide powder, comprising the steps of:

feeding a raw material powder mixture containing silicon dioxide powder into a reaction furnace, heating the mixture in the furnace in an inert gas or in vacuum to a temperature of 1,100 to 1,600° C. to produce a silicon oxide gas, introducing the silicon oxide gas into a cooling chamber through a transfer conduit which is maintained at a temperature of from higher than 1,000° C. to 1,300° C., thereby causing silicon oxide to deposit on a surface of a substrate which is disposed and cooled in the cooling chamber, and continuously recovering the silicon oxide deposit.

2. The method of claim 1 wherein the raw material powder mixture is a mixture comprised of a silicon dioxide powder and a metal silicon powder.

3. The method of claim 1 wherein the raw material powder mixture is a mixture comprised of a silicon dioxide powder and a reducing powder therefor.

4. The method of claim 1 wherein the raw material powder mixture is a mixture comprised of a silicon dioxide powder and a carbon-containing powder.

5. A method according to claim 1, wherein heating the mixture in the furnace is to a temperature of 1,200 to 1,500° C.

6. A method according to claim 1, wherein when heating the mixture in the furnace, the furnace is under vacuum.

7. A method according to claim 1, wherein the transfer conduit is maintained at 1,100 to 1,200° C.

8. A method according to claim 1, wherein the substrate is cooled to 200 to 500° C.

9. A method according to claim 1, wherein the substrate is cooled to 300 to 400° C.

10. A method according to claim 1, wherein recovering the silicon oxide deposit is performed by a scaper.

\* \* \* \* \*